United States Patent [19]

Tamura

[11] Patent Number: 4,717,089
[45] Date of Patent: Jan. 5, 1988

[54] WEBBING RETRACTOR FOR VEHICLE
[75] Inventor: Keiichi Tamura, Aichi, Japan
[73] Assignee: Kabushiki Kaisha Tokai-Rika-Dinki-Seisakusho, Japan
[21] Appl. No.: 883,338
[22] Filed: Jul. 8, 1986
[30] Foreign Application Priority Data
   Jul. 10, 1985 [JP] Japan .............. 60-104923[U]
[51] Int. Cl.⁴ .................................. B65H 75/48
[52] U.S. Cl. ................ 242/107.4 A; 242/107.4 B
[58] Field of Search ............ 242/107.4 A, 107.4 B, 242/107.4 R; 280/806; 297/478

[56] References Cited
U.S. PATENT DOCUMENTS

| | | | |
|---|---|---|---|
| 3,937,416 | 2/1976 | Henderson | 242/107.4 A |
| 4,109,881 | 8/1978 | Föhl | 242/107.4 A |
| 4,148,446 | 4/1979 | Sugar | 242/107.4 A |
| 4,162,773 | 7/1979 | Wallin | 242/107.4 A |
| 4,218,033 | 8/1980 | Finn et al. | 242/107.4 A |
| 4,293,106 | 10/1981 | Standing | 242/107.4 A |
| 4,386,745 | 6/1983 | Patel et al. | 242/107.4 A X |
| 4,467,981 | 8/1984 | Mori et al. | 242/107.4 A |
| 4,597,546 | 7/1986 | Yamamoto et al. | 242/107.4 A |

FOREIGN PATENT DOCUMENTS
2073578 10/1981 United Kingdom ........ 242/107.4 A

Primary Examiner—Stuart S. Levy
Assistant Examiner—Joseph J. Hail, III
Attorney, Agent, or Firm—Sixbey, Friedman & Leedom

[57] ABSTRACT

A webbing retractor for use in an occupant restraining seatbelt system for a vehicle includes a lock wheel supported on one end portion of a webbing take-up shaft and an acceleration sensor. When an emergency situation of the vehicle occurs, the lock wheel and the acceleration sensor are engaged with each other, thereby causing a lock bar to be engaged with a ratchet wheel rigidly secured to the take-up shaft, and thus locking the take-up shaft from rotating in a direction in which the webbing is unwound. The lock wheel and the lock bar are connected together through a friction member by a predetermined frictional force. Accordingly, even when the lock wheel and the acceleration sensor are still engaged with each other after an emergency situation of the vehicle has ceased, the webbing can be unwound from the take-up shaft with a force which is greater than the predetermined frictional force.

18 Claims, 5 Drawing Figures

WEBBING RETRACTOR FOR VEHICLE

BACKGROUND OF THE INVENTION

1. Field of the Invention

The present invention relates to a webbing retractor employed in a seatbelt system for a vehicle designed to restrain the body of an occupant in an emergency situation of the vehicle, the webbing retractor being adapted to instantaneously stop the webbing of the seatbelt system from being unwound when an emergency situation of the vehicle occurs.

2. Description of the Related Art

In a typical seatbelt system, one end of an occupant restraining webbing is wound up in layers on a take-up shaft of a webbing retractor.

One type of such take-up shaft has heretofore been arranged such that, when the vehicle is in a normal state, the take-up shaft is allowed to rotate in a direction in which the webbing is unwound, whereas, when the vehicle runs into an emergency situation, an acceleration sensor detects it and causes a lock bar to engage with a main gear wheel rotating together with the take-up shaft, thereby locking the take-up shaft from rotating in the webbing unwinding direction, and thus enabling the occupant's body to be restrained by the webbing.

The lock bar is actuated to engage with the main gear wheel through a friction spring in response to the rotation of an inner gear wheel which is rotatably supported by the take-up shaft.

The rotation of the take-up shaft is applied to the inner gear wheel through a pawl which is adapted such that, when the vehicle is in a normal state, the pawl is separated from the inner periphery of the inner gear wheel and rotates around the take-up shaft, whereas, when the rotation of the pawl is delayed with respect to the rotation of the take-up shaft, one end portion of the pawl is meshed with the inner gear wheel.

The delay in rotation of the pawl is caused by the acceleration sensor, and a lock wheel is interposed between the acceleration sensor and the pawl.

The lock wheel is rotatably supported by the take-up shaft, and a pin which is provided at a part in the radial direction thereof is pivotally supported by the pawl, whereby the rotation of the take-up shaft is transmitted to the lock wheel through the pawl.

Accordingly, when the lock wheel is stopped from rotating by the action of the acceleration sensor, the rotation of the pawl is delayed with respect to the rotation of the take-up shaft, and the pawl is thereby meshed with the inner gear wheel.

In this type of the conventional webbing retractor, the lock bar may be so firmly meshed with the main gear wheel that they fail to disengage from each other even after an emergency situation has ceased.

In order to forcedly disengage them, a spool release mechanism is installed in the above-described retractor, and the lock bar can be disengaged from the main gear wheel by actuating this mechanism.

However, when the lock bar and the main gear wheel are disengaged from each other to allow the webbing to be unwound from the take-up shaft, there are cases where the acceleration sensor and the lock wheel remain engaged with each other, and if the webbing is forced to be unwound in this state, the constituent elements of the acceleration sensor and the lock wheel may be damaged.

SUMMARY OF THE INVENTION

In view of the above-described circumstances, it is a primary object of the present invention to provide a webbing retractor for a vehicle which enables the webbing to be unwound from the take-up shaft without damaging the acceleration sensor and the lock wheel even when the lock ring and the acceleration sensor are still engaged with each other after an emergency situation of the vehicle has ceased.

To this end, the present invention provides a webbing retractor for a vehicle, which comprises: a take-up shaft adapted to retain one end of a webbing and biased in a direction in which the webbing is wound up thereon by biasing means; lock means activated when an emergency situation of the vehicle occurs so as to lock the take-up shaft from rotating in a direction in which the webbing is unwound; acceleration detecting means for detecting an emergency situation of the vehicle; a lock wheel adapted such that, when the vehicle is in a normal state, the lock wheel rotates in unison with the rotation of the take-up shaft, whereas, when an emergency situation of the vehicle occurs, the lock wheel engages with the acceleration detecting means so that the rotation of the lock wheel is delayed with respect to the rotation of the take-up shaft; engaging means including a pawl activated when the rotation of the lock wheel is delayed, and a receiving member adapted such that, when the vehicle is in a normal state, the receiving member is separated from the pawl, whereas, when the pawl is activated, the receiving member is engaged with the pawl so as to activate the lock means; first slip means disposed between the lock wheel and the pawl to connect them together by means of a predetermined frictional force; and second slip means disposed between the lock means and the receiving member to connect them together by means of a predetermined frictional force.

By virtue of the above-described arrangement, when the vehicle runs into an emergency situation, the lock means is activated to lock the take-up shaft from rotating in a direction in which the webbing is unwound, and even when the lock wheel and the acceleration sensor are still engaged with each other after an emergency situation of the vehicle has ceased, the webbing can be unwound from the take-up shaft without damaging the acceleration sensor, the lock wheel, etc.

DESCRIPTION OF THE PREFERRED EMBODIMENT

Figure 1:
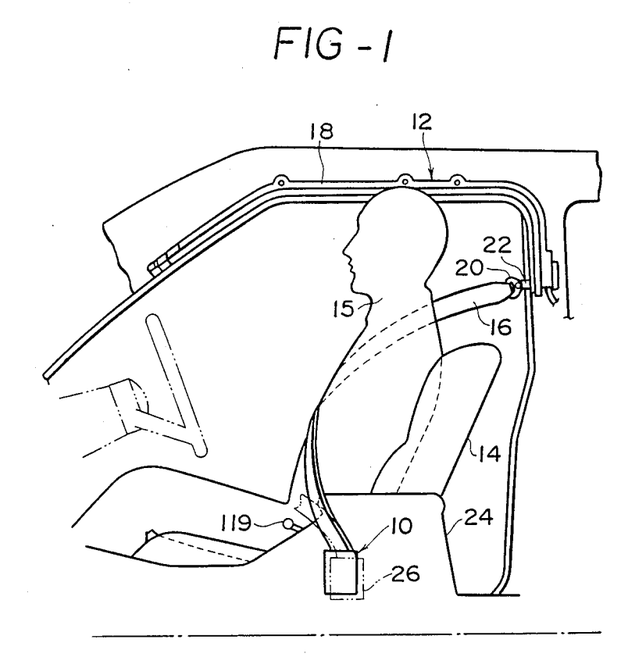
FIG. 1 is a front view showing the way in which an automatic seatbelt system is disposed on a vehicle, to which seatbelt system is applied one embodiment of the webbing retractor according to the present invention.

FIG. 1 shows an automatic seatbelt system 12 to which one embodiment of the webbing retractor 10 according to the present invention is applied.

This automatic seatbelt system 12 is designed for an occupant seated in the driver's seat and arranged such that a webbing 16 can automatically be fastened to and unfastened from the body of an occupant 15 seated in a seat 14.

A guide rail 18 is disposed near a roof side member of the vehicle, and a groove (not shown) is provided in the surface of the guide rail 18 which faces the lower side of the vehicle.

One end of the webbing 16 is retained by an anchor plate 22 through a connecting member 20, and the anchor plate 22 is received in the above-described groove. The anchor plate 22 is movable along the guide rail 18 in the longitudinal direction of the vehicle by the action of a drive means (not shown).

The other end portion of the webbing 16 is wound up into a webbing retractor 10 which is disposed inside a center console 24 disposed in the center of the vehicle and which is rigidly secured to the body of the vehicle. Thus, when the anchor plate 22 is moved toward the rear end of the vehicle, the occupant 15 can be brought into the webbing fastened condition, whereas, when the anchor plate 22 is moved toward the front end of the vehicle, a space is provided between the webbing 16 and the seat 14, thereby allowing the occupant 15 to readily enter or leave the vehicle.

A webbing retractor 26 (see FIG. 5) of an automatic seatbelt system for an occupant seated in the other front passenger seat is disposed near the retractor 10, the retractors 10 and 26 having the same configuration as each other.

Figure 2:
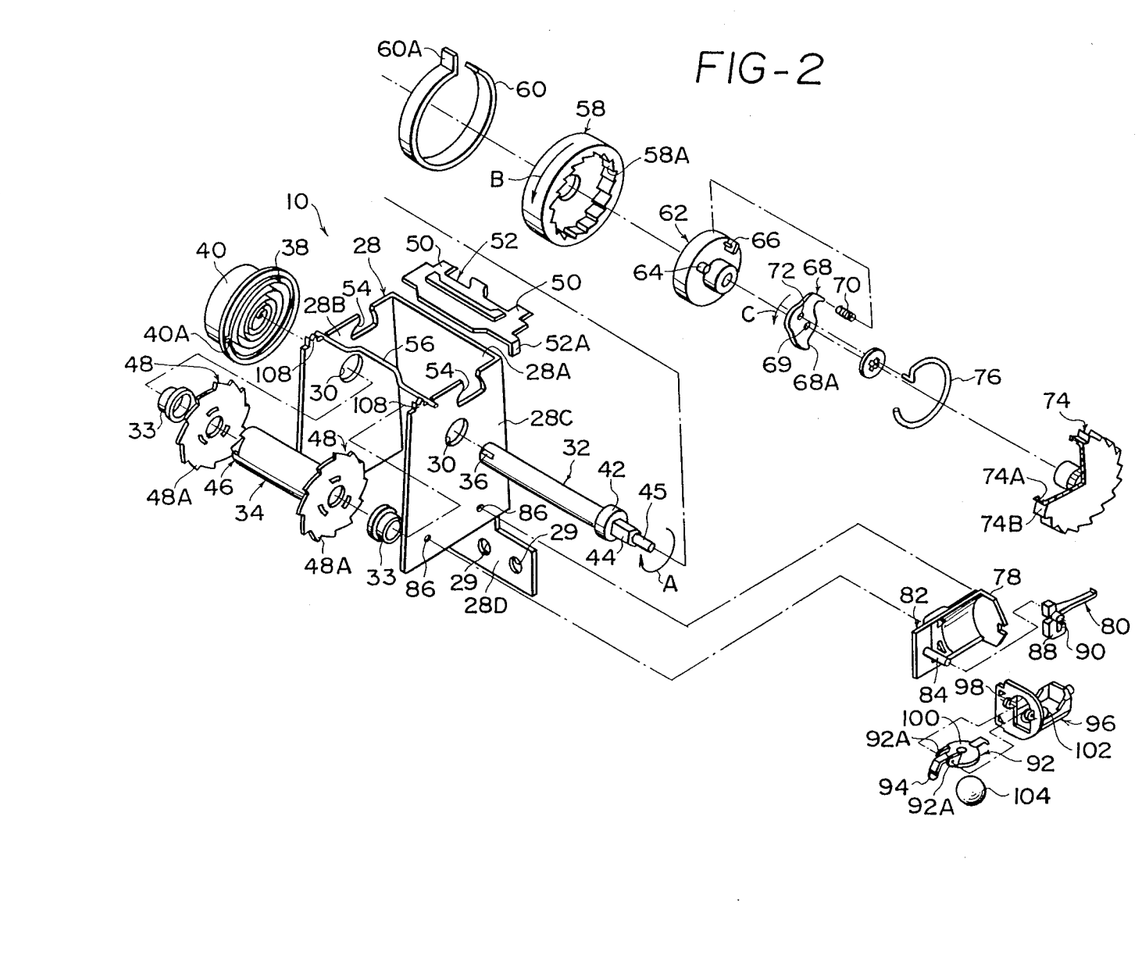
FIG. 2 is an exploded perspective view of the webbing retractor according to the present invention.

Referring next to FIG. 2, each of the members which constitute the retractor 10 is mounted on a frame 28. The frame 28 consists of a base 28A and leg plates 28B, 28C which extend parallel with each other from two ends, respectively, of the base 28A.

In addition, a substantially L-shaped mounting bracket 28D is formed integral with the base 28A in such a manner that the bracket 28D extends downwardly from the lower end (as viewed in FIG. 2) of the base 28A and bends at the center thereof toward the leg plate 28C.

Bores 29 with a circular cross-section are provided in the mounting bracket 28D, and bolts (not shown) are respectively received through the bores 29 to secure the bracket 28D to the vehicle body.

Coaxial bores 30 with a circular cross-section are respectively provided in the leg plates 28B and 28C, and a take-up shaft 32 adapted to wind up the webbing 16 thereon in layers is rotatably carried by the bores 30 through bushes 33.

A pipe 34 which is made of a synthetic resin is secured to the outer peripheral surface of the intermediate portion of the take-up shaft 32.

A slit (not shown) is provided in the pipe 34, and the endmost portion of the webbing 16 is retained by this slit, so that the webbing 16 is wound up in response to the rotation of the take-up shaft 32.

A slit 36 is provided in the end portion of the take-up shaft 32 which projects from the leg plate 28B, and the inner end portion of a spiral spring 38 is retained by the slit 36. The spiral spring 38 is accommodated in a spring cover 40, the outer end portion of the spring 38 being retained by a notch 40A provided in the inner peripheral surface of the spring cover 40.

Thus, the take-up shaft 32 is biased so as rotate in a direction in which the webbing 16 is wound up (in the direction of the arrow A shown in FIG. 2).

Fitting portions 46 are respectively formed at both axial ends of the pipe 34 secured to the take-up shaft 32, and main gear wheels (ratchet wheels) 48 are respectively fitted on the fitting portions 46 in such a manner that the main gear wheels 48 are located inside the respective leg plates 28B and 28C.

Thus, the main gear wheels 48 are rotated together with the take-up shaft 32. In addition, a lock bar 52 is stretched between the leg plates 28B and 28C, the lock bar 52 having lock pawls 50 respectively opposing the toothed portions 48A of the main gear wheels 48.

Notches 54 having a substantially trapezoidal cross-section are respectively provided at the upper ends (as viewed in FIG. 2) of the leg plates 28B and 28C. The two axial end portions of the lock bar 52 are respectively received in the notches 54.

Accordingly, the lock bar 52 is pivotal within the notches 54 in such a manner that the lock pawls 50 come in and out of engagement with the toothed portions 48A of the main gear wheels 48, respectively.

It should be noted that a wire spring 56 is stretched between positions at the respective upper ends of the leg plates 28B and 28C which are near the notches 54 in such a manner that the spring 56 biases the lock bar 52 in a direction in which the lock pawls 50 of the lock bar 52 are separated from the respective toothed portions 48A.

The end portion of the lock bar 52 which projects from the leg plate 28C is extended and bent to provide a tongue piece 52A. The tongue piece 52A is disposed in opposing relation to a friction spring (friction member) 60 serving as a slip means which is mounted by means of a predetermined biasing force on the outer periphery of an inner gear wheel 58 serving as a receiving member.

Figure 3:
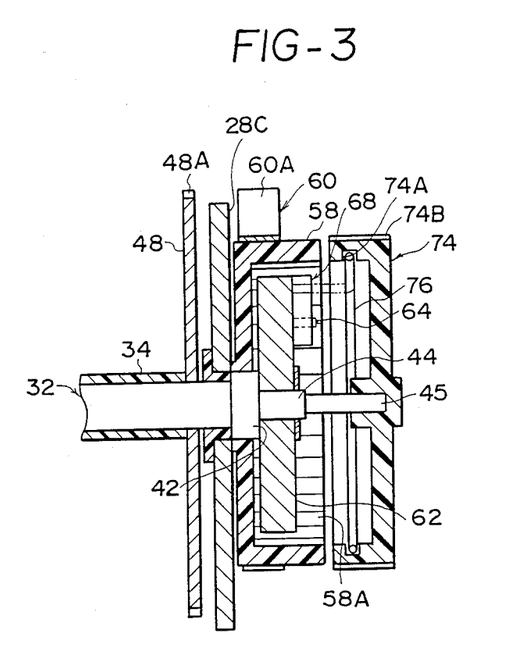
FIG. 3 is a sectional view showing the lock means employed in the embodiment in an assembled state.

As also shown in FIG. 3, the portion of the take-up shaft 32 which projects outward from the leg plate 28C is provided with an enlarged-diameter portion 42. Further, smaller-diameter shafts 44 and 45 which are reduced in diameter in two stages are formed integral with the enlarged-diameter portion 42.

The inner gear wheel 58 is rotatably supported on the enlarged-diameter portion 42 of the take-up shaft 32. The inner gear wheel 58 has the shape of a dish or pan having a recess formed on the side thereof which is remote from the leg plate 28C. One longitudinal end portion of the friction spring 60, which is mounted on the inner gear wheel 58, is bent so as to project outward in the radial direction, thereby providing an interlocking portion 60A. Accordingly, when the inner gear wheel 58 rotates in the direction of the arrow B shown in FIG. 2, the interlocking portion 60A presses against the tongue piece 52A, thus causing the lock bar 52 to be engaged with the main gear wheels 48 against the biasing force from the wire spring 56.

A toothed portion 58A is formed on the inner peripheral surface of the inner gear wheel 58. A drive disk 62 is rigidly secured on the smaller-diameter shaft 44 formed at the end of the take-up shaft 32 and accommodated in the inner gear wheel 58 in such a manner that the drive disk 62 is separated from the toothed portion 58A.

Pins 64 and 66 are integrally formed on one end face of the drive disk 62, the pin 64 extending parallel with the axis of the drive disk 62, and the pin 66 extending parallel with the tangential direction.

A pawl 68 is pivotally supported by the pin 64 through a circular bore 69 provided in the intermediate portion thereof. An engaging portion 68A is formed at one end of the pawl 68, the engaging portion 68A being adapted to come in and out of engagement with the toothed portion 58A of the inner gear wheel 58 in response to the pivoting motion of the pawl 68 about the pin 64.

A compression coil spring 70 is disposed between the other end portion of the pawl 68 and the pin 66 so as to bias the pawl 68 in a direction (the direction of the arrow C shown in FIG. 2) in which the engaging portion 68A is separated from the toothed portion 58A.

Another bore 72 having a circular cross-section is provided in the pawl 68 near the bore 69 so as to movably retain one end portion of a slip spring (friction member) 76 serving as a slip means which is mounted on a lock wheel 74 by means of a predetermined biasing force.

The lock wheel 74 is rotatably supported on the smaller-diameter shaft 45 formed integral with the take-up shaft 32. The lock wheel 74 has the shape of a dish or pan having a recess formed on the side thereof which is closer to the leg plate 28C.

The slip spring 76 is retained by a predetermined frictional force within a groove 74A formed along the inner peripheral surface of the lock wheel 74. One end portion of the spring 76 is bent so as to extend toward the pawl 68 and movably retained by the bore 72.

Thus, the lock wheel 74 is subjected to the rotational force of the drive disk 62 through the pawl 68 and the slip spring 76 so as to rotate together with the take-up shaft 32.

A toothed portion 74B is formed along the outer peripheral surface of the lock wheel 74 in such a manner as to oppose a sensor pawl 80 of an acceleration sensor 78.

The sensor pawl 80 is pivotally supported by a pin 84 which is provided on a bracket 82. The bracket 82 is secured to the leg plate 28C in such a manner that pins (not shown) which are provided on the surface (not seen in FIG. 2) of the bracket 82 are rigidly fitted into circular bores 86, respectively, provided in the leg plate 28C.

Figure 4:
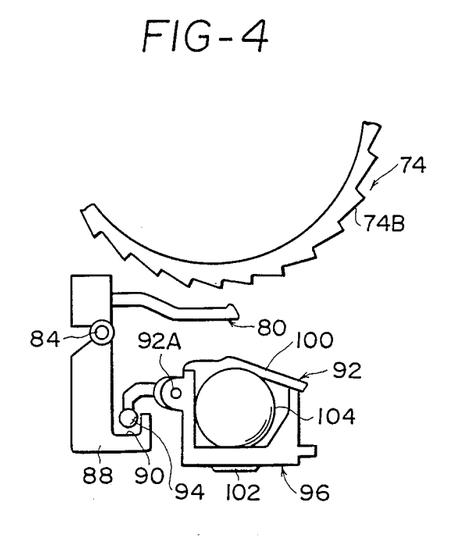
FIG. 4 is a front view of the acceleration sensor employed in the embodiment.

The sensor pawl 80 is pivotal about the pin 84 so that it is meshed with the toothed portion 74B of the lock wheel 74 when the sensor pawl 80 is tilted counter-clockwise from the horizontal position shown in FIG. 4.

A hook 88 is extended from one portion of the sensor pawl 80, the hook 88 having a substantially U-shaped cross-section as viewed in the axial direction of the take-up shaft 32. A recess 90 defined by the substantially U-shaped hook 88 accommodates a ball 94 which is formed at one end of a lever 92.

Pins 92A are respectively provided at two lateral (in the axial direction of the take-up shaft 32) ends of the intermediate portion of the lever 92 and are pivotally supported by two end portions of a pivotally supporting bore 98 provided in a ball casing 96.

An umbrella portion 100 is provided on the side of the lever 92 which is remote from the ball 94, and put on a ball 104 mounted in a mortar-shaped slanting surface 102 of the ball casing 96.

Accordingly, when the acceleration which acts on the vehicle reaches a predetermined value, the ball 104 goes up the slanting surface 102 to push up the umbrella portion 100, thus causing the lever 92 to pivot about the pins 92A.

In consequence, the ball 94 tilts the sensor pawl 80 so as to mesh with the toothed portion 74B of the lock wheel 74.

More specifically, when the lock wheel 74 is stopped from rotating by the sensor pawl 80, the lock wheel 74 causes the rotation of the pawl 68 to be delayed with respect to the rotation of the take-up shaft 32 through the slip spring 76, thereby allowing the pawl 68 to pivot counter to the direction of the arrow C shown in FIG. 2 about the pin 64.

This operation causes the lock bar 52 to be engaged with the main gear wheels 48, and the take-up shaft 32 is thereby stopped from rotating in a direction in which the webbing 16 is unwound. When the vehicle returns to a normal state, the lock bar 52, which is subjected to the biasing force from the wire spring 56, is moved in a direction in which it is disengaged from the main gear wheels 48.

It should be noted that there are cases where, even when the emergency situation of the vehicle has ceased, the lock bar 52 is so firmly engaged with the main gear wheels 48 that it cannot be moved by the biasing force of the wire spring 56 alone. For this reason, a spool release lever 106 which is adapted to forcedly cancel the engagement between the lock bar 52 and the main gear wheels 48 is provided in this embodiment.

Figure 5:
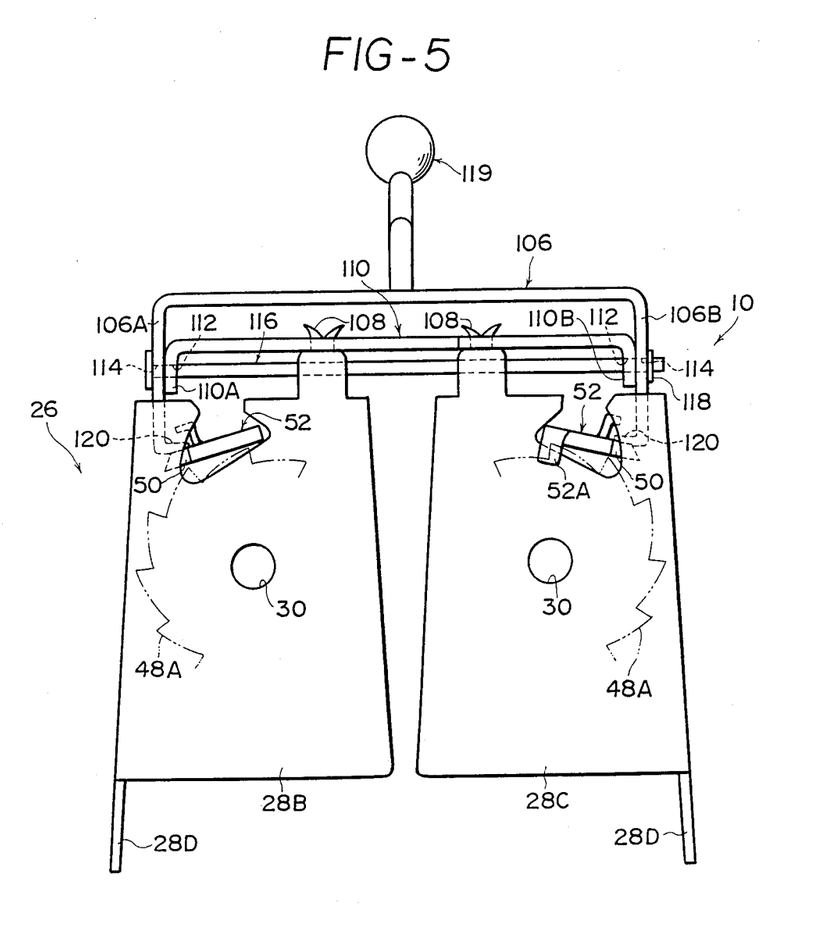
FIG. 5 is a front view showing the way in which a spool release lever is mounted on two webbing retractors.

The spool release lever mechanism will be explained below in details. As shown in FIG. 5, the respective webbing retractors 10 and 26 of the automatic seatbelt systems for the occupants seated in the front seats are disposed in opposing relation to each other.

As shown in FIGS. 2 and 5, engagement pawls 108 are respectively formed at the upper ends of the leg plates 28B and 28C of each of the retractors 10 and 26. The pawls 108 are fitted into the intermediate portion of a spool release bracket 110 and caulked.

Both end portions of the spool release bracket 110 are bent so as to provide leg portions 110A and 110B which extend downward as viewed in FIG. 5 in parallel with each other, and coaxial bores 112 having a circular cross-section are respectively provided in the leg portions 110A and 110B.

The above-described spool release lever 106 is disposed in such a manner as to overlap the spool release bracket 110.

Both end portions of the spool release lever 106 are also bent so as to provide leg portions 106A and 106B which extend downward in parallel with each other, and coaxial bores 114 having a circular cross-section are respectively provided in the leg portions 106A and 106B.

The bores 112 and the bores 114 have the same diameter and are disposed on the same axis, and a spool release shaft 116 is received through the bores 112 and 114. A stopper ring 118 is fitted on the distal end portion of the spool release shaft 116.

Thus, the spool release lever 106 can be pivoted about the spool release shaft 116 by actuating a control member 119 secured to the upper end portion of the lever 106.

Pawls 120 for disengaging the lock bar 52 are respectively formed at the distal ends of the leg portions 106A and 106B of the spool release lever 106, and retained by the respective intermediate portions of the lock bars 52 installed in the retractors 10 and 26.

Accordingly, when the spool release lever 106 is pivoted about the spool release shaft 116 from the position shown in FIG. 5, the lock bars 52 can be pulled up.

The following is a description of the operation of this embodiment arranged as detailed above.

When the occupant 15 enters or leaves the vehicle, the anchor plate 22 has already been moved toward the front end of the vehicle along the guide rail 18 to provide a space between the webbing 16 and the seat 14. Therefore, the occupant 15 can readily enter or leave the vehicle.

When the occupant 15 is seated in the seat 14, the anchor plate 22 is moved along the guide rail 18 toward the rear end of the vehicle by the action of the drive means, thereby allowing the occupant 15 to be automatically brought into a webbing fastened condition.

When the vehicle is in a normal state, the webbing 16 which has been wound up in layers on the take-up shaft 32 of the retractor 10 can be unwound as desired. Therefore, when the occupant 15 moves, for example, to actuate switches or the like, the webbing 16 is smoothly unwound and rewound in response to the movement of the occupant 15 without any fear of the webbing 16 hindering him from moving as desired.

When the vehicle runs into an emergency situation, the inertia which acts on the body of the occupant 15 is applied through the webbing 16 to the take-up shaft 32 so as to rotate in the direction in which the webbing 16 is unwound (the direction counter to the direction of the arrow A shown in FIG. 2), but at the same time, the ball 104 of the acceleration sensor 78 senses this situation.

More specifically, the ball 104 which is mounted on the mortar-shaped slanting surface 102 of the ball casing 96 goes up the slanting surface 102.

In consequence, the ball 104 pushes up the umbrella portion 100 of the lever 92 above it. Thus, the lever 92 is pivoted about the pins 92A, and the ball 94 causes the sensor pawl 80 to tilt so as to mesh with the toothed portion 74B of the lock wheel 74 rotating together with the take-up shaft 32.

When the rotation of the lock wheel 74 is stopped by the engagement between the sensor pawl 80 and the toothed portion 74B, the slip spring 76 is also stopped from rotating, thus causing the rotation of the pawl 68 to delay with respect to the rotation of the take-up shaft 32. In consequence, the pawl 68 is pivoted about the pin 64 counter to the direction of the arrow C shown in FIG. 2.

Thus, the engaging portion 68A of the pawl 68 meshes with the toothed portion 58A of the inner gear wheel 58, so that the force of rotation of the drive disk 62 in the direction of the arrow B shown in FIG. 2 is applied to the inner gear wheel 58. At this time, the slip spring 76 is also subjected to the rotational force in the same direction, but since the lock wheel 74 is engaged with the sensor pawl 80, the slip spring 76 is slid within the groove 74A.

When the inner gear wheel 58 is rotated, the interlocking portion 60A of the friction spring 60 mounted on the outer periphery of the inner gear wheel 58 abuts against the tongue piece 52A of the lock bar 52 and presses it against the biasing force from the wire spring 56, causing the lock pawls 50 of the lock bar 52 to mesh with the toothed portions 48A of the main gear wheels 48, respectively.

Thus, the take-up shaft 32 is locked from rotating in the direction in which the webbing 16 is unwound (the direction counter to the direction of the arrow A shown in FIG. 2, thereby allowing the body of the occupant 15 to be restrained by the webbing 16.

It should be noted that there is a slight difference between the time when the press of the interlocking portion 52A against the tongue piece 52A is completed and the time when the lock pawls 50 of the lock bar 52 are completely meshed with the respective toothed portions 48A of the main gear wheels 48, and the take up shaft 32 therefore still rotates even after the press of the interlocking portion 60A against the tongue piece 52A has been completed. However, it is possible to obtain synchronism therebetween by virtue of the relative rotation between the inner gear wheel 58 and the friction spring 60.

Accordingly, there is no fear of the engaging portion 68A of the pawl 68 and the toothed portion 58A of the inner gear wheel 58 being damaged.

As described above, when an emergency situation of the vehicle occurs, the lock bar 52 engages with the main gear wheels 48, and the occupant 15 is thereby brought into a webbing fastened condition. On such occasion, there are cases where the lock bar 52 cannot be disengaged from the main gear wheels 48 by means of the biasing force from the wire spring 56 alone even after the emergency situation of the vehicle has ceased because the lock bar 52 is fixedly engaged with the main gear wheels 48 due to, for example, deformation of the lock bar 52.

In such cases, the lock bar 52 can be forcedly disengaged from the main gear wheels 48 simply by turning the spool release lever 106.

The spool release lever 106 is interlocked with both the retractors 10 and 26 of the automatic seatbelt systems for the two front sheets, so that, when the spool release lever 106 is pivoted about the spool release shaft 116 by actuating the control member 119, the lock bars 52 of the retractors 10 and 26 can simultaneously be disengaged from the respective main gear wheels 48.

There are also cases where, after the lock bar 52 has been disengaged from the main gear wheels 48, the sensor pawl 80 of the acceleration sensor 78 is still engaged with the toothed portion 78B of the lock wheel 74. In this embodiment, however, the slip spring 76 is interposed between the lock wheel 74 and the pawl 68 in such a manner that the slip spring 76 is retained within the groove 74A in the lock ring 74 by means of a predetermined frictional force. Therefore, if a force greater than the frictional force is applied, the slip spring 76 and the lock wheel 74 rotate relative to each other, and the inner gear wheel 58 and the friction spring 60 also rotate relative to each other, which means that it is possible to unwind the webbing 16 from the take-up shaft 32 without damaging the toothed portion 74B of the lock wheel 74, the sensor pawl 80 and the acceleration sensor 78.

It should be noted that, although in this embodiment the webbing retractor is applied to an automatic seatbelt system, it is also applicable to an ordinary three-point type seatbelt system.

In addition, the spool release mechanism is not necessarily limitative to that shown in this embodiment, and it may be provided for each of the retractors.

As has been described above, the present invention provides a webbing retractor for a vehicle, which comprises: a take-up shaft adapted to retain one end of a webbing and biased in a direction in which the webbing is wound up thereon by biasing means; lock means activated when an emergency situation of the vehicle occurs so as to lock the take-up shaft from rotating in a direction in which the webbing is unwound; acceleration detecting means for detecting an emergency situation of the vehicle; a lock wheel adapted such that, when the vehicle is in a normal state, the lock wheel rotates in unison with the rotation of the take-up shaft, whereas, when an emergency situation of the vehicle occurs, the lock wheel engages with the acceleration detecting means so that the rotation of the lock wheel is delayed with respect to the rotation of the take-up shaft; engaging means including a pawl activated when the rotation of the lock wheel is delayed, and a receiving member adapted such that, when the vehicle is in a normal state, the receiving member is separated from the pawl, whereas, when the pawl is activated, the receiving member is engaged with the pawl so as to activate the lock means; first slip means disposed between the lock wheel and the pawl to connect them together by means of a predetermined frictional force; and second slip means disposed between the lock means and the receiving member to connect them together by means of a predetermined frictional force. Therefore, even when the lock wheel and the acceleration sensor are still engaged with each other after an emergency situation of the vehicle has ceased, the webbing can be unwound from the take-up shaft without damaging the acceleration sensor, the lock wheel, etc.

What is claimed is:

1. A webbing retractor for a vehicle, which comprises:
   (a) a take-up shaft adapted to retain one end of a webbing and biased in a direction in which said webbing is wound up thereon by a biasing means;
   (b) lock means activated when an emergency situation of the vehicle occurs so as to prevent said take-up shaft from rotating in a direction in which said webbing is unwound;
   (c) acceleration detecting means for detecting an emergency situation of the vehicle;
   (d) a lock wheel adapted such that, when the vehicle is in a normal state, said lock wheel rotates in unison with the rotation of said take-up shaft, but when an emergency situation of the vehicle occurs, said acceleration detecting means engages said lock wheel so that the rotation of said lock wheel is delayed relative to the rotation of said take-up shaft;
   (e) engaging means including a pawl and a receiving member, wherein said pawl is activated to engage the receiving member when the rotation of said lock wheel is delayed, thereby actuating said lock means;
   (f) first slip means disposed between said lock wheel and said pawl to connect them together by means of a first predetermined frictional force; and
   (g) second slip means disposed between said lock means and said receiving member to connect them together by means of a second predetermined frictional force, so that said first and second slip means prevent the transmission of potentially damaging forces between said lock wheel and pawl and said lock means and receiving member, respectively, when said webbing is unwound after an emergency vehicular situation even when said lock wheel and said acceleration detecting means are still forcefully engaged with each other as a result of said emergency situation.

2. A webbing retractor according to claim 1, further comprising:
   release means for canceling the locking of said take-up shaft by said lock means.

3. A webbing retractor according to claim 1, wherein said first slip means is defined by a first friction member which is supported by means of a frictional force within an annular groove formed in said lock wheel around the axis thereof and which is retained at one end portion thereof by said pawl.

4. A webbing retractor according to claim 3, wherein said second slip means is defined by a second friction member which is supported by means of a frictional force on the outer periphery of said receiving member and adapted to activate said lock means through one end portion thereof.

5. A webbing retractor according to claim 4, wherein said lock means includes a ratchet wheel which is rigidly secured to one axial end portion of said take-up shaft so as to rotate together with said take-up shaft, and a lock bar engageable with said ratchet wheel by the action of said second friction member.

6. A webbing retractor according to claim 5, wherein said second friction member is a friction spring which has a ring-shaped configuration and abuts against said lock bar at one portion thereof so as to move said lock bar in a direction in which it is engaged with said ratchet wheel.

7. A webbing retractor according to claim 6, wherein said first friction member has a ring-shaped configuration, one end portion of said first friction member being bent toward said pawl so as to be retained thereby.

8. A webbing retractor according to claim 7, wherein said pawl is pivotally supported on one side surface of a drive disk which is penetrated at the center thereof by said take-up shaft and which is rigidly secured thereon.

9. A webbing retractor according to claim 8, wherein said receiving member is rotatably supported on said take-up shaft and has a recess around the axis thereof, said receiving member further having internal teeth formed on the peripheral surface of said recess, and said pawl being engaged with said internal teeth when said lock wheel is engaged with said acceleration detecting means.

10. A webbing retractor according to claim 9, further comprising:
    canceling means for canceling the engagement between said ratchet wheel and said lock bar.

11. A webbing retractor for use in a seatbelt system for a vehicle designed to restrain the body of an occupant by a webbing when an emergency situation of the vehicle occurs, which comprises:
    (a) a frame secured to the vehicle;
    (b) a take-up shaft rotatably supported by said frame and biased in a direction in which said webbing is wound up thereon by biasing means;
    (c) lock means having a ratchet wheel rigidly secured to one axial end portion of said take-up shaft so as to rotate together with said take-up shaft, and a lock bar pivotally supported by said frame and adapted to be pivoted by said friction spring in a direction in which it is engaged with said ratchet wheel, said lock means being activated when an emergency situation of the vehicle occurs so as to said take-up shaft from rotating in a direction in which said webbing is unwound;
    (d) an acceleration sensor activated when detecting an emergency situation of the vehicle;
    (e) a lock wheel rotatably supported on one end portion of said take-up shaft and adapted such that, when the vehicle is in a normal state, said lock wheel rotates in unison with the rotation of said take-up shaft, but when an emergency situation of the vehicle occurs, the rotation of said lock wheel is delayed with respect to the rotation of said take-up shaft by the action of said acceleration sensors;

(f) a first slip means having a ring-shaped slip spring supported by means of a first frictional force within an annular groove formed in said lock wheel around the axis thereof and retained at one end portion thereof by said pawl;

(g) a pawl activated by said first slip means when the rotation of said lock wheel is delayed with respect to the rotation of said take-up shaft;

(h) a receiving member rotatably supported on one end portion of said take-up shaft and adapted such that, when the vehicle is in a normal state, said receiving member is separated from said pawl, whereas, when said pawl is activated, said receiving member is engaged with said pawl; and (i) a second slip means having a ring-shaped friction spring which is supported by means of a second frictional force on the outer periphery of said receiving member and adapted to activate said lock means through one end portion thereof when said receiving member and said pawl are engaged with each other, whereby said first and second slip means prevent the transmission of damaging forces between said lock wheel and pawl and said lock means and receiving member, respectively, when the webbing is forcefully unwound after an emergency situation has occurred, even when said lock wheel and said acceleration sensor are still engaged with each other as a result of said situation.

12. A webbing retractor according to claim 11, further comprising:
release means for canceling the locking of said take-up shaft by said lock means.

13. A webbing retractor according to claim 11, wherein said pawl is disposed between said lock wheel and said receiving member and pivotally supported on one side surface of a drive disk rigidly secured on said take-up shaft.

14. A webbing retractor according to claim 13, wherein said receiving member is rotatably supported on said take-up shaft and has a recess around the axis thereof, said receiving member further having internal teeth formed on the peripheral surface of said recess, and said pawl being engaged with said internal teeth when said lock wheel is engaged with said acceleration detecting means.

15. A webbing retractor according to claim 13, further comprising:
canceling means for canceling the engagement between said ratchet wheel and said lock bar.

16. A webbing retractor for use in a seatbelt system for a vehicle designed to restrain the body of an occupant by a webbing when an emergency situation of the vehicle occurs, which comprises:
(a) a frame secured to the vehicle;
(b) a take-up shaft rotatably supported by said frame and biased in a direction in which said webbing is wound up thereon by biasing means;
(c) lock means including a ratchet wheel which is rigidly secured to one end portion of said take-up shaft so as to rotate together with said take-up shaft, and a lock bar pivotally supported by said frame and engaged with said ratchet wheel when an emergency situation of the vehicle occurs so as to lock said take-up shaft from rotating in a direction in which said webbing is unwound;

(d) an acceleration sensor including an inertia member which detects an emergency situation of the vehicle, and a sensor pawl activated by said inertia member;

(e) a lock wheel having lock teeth formed on the outer periphery thereof and rotatably supported on one end portion of said take-up shaft, said lock wheel being adapted such that, when the vehicle is in a normal state, said lock wheel rotates in unison with the rotation of said take-up shaft, but when an emergency situation of the vehicle occurs, the sensor pawl of said acceleration sensor and said lock teeth are engaged with each other so as to delay the rotation of said lock wheel with respect to the rotation of said take-up shaft;

(f) a ring-shaped slip spring supported by first predetermined frictional force within a groove formed in one side surface of said lock wheel around the axis thereof;

(g) a pawl which retains one end portion of said slip spring and which is activated when the rotation of said lock wheel is delayed with respect to the rotation of said take-up shaft;

(h) a receiving member rotatable supported on one end portion of said take up shaft and having a recess formed around the axis thereof and ratchet teeth forced on the peripheral surface of said recess as well as accommodating said pawl within said recess, said receiving member being adapted such that, when the vehicle is in a normal state, said receiving member is separated from said pawl, whereas, when said pawl is activated, said receiving member is engaged with said pawl;

(i) a friction spring supported on the outer peripheral surface of said receiving member by means of a second predetermined frictional force and adapted to abut against said lock bar when said receiving member and said pawl are engaged with each other so as to pivot said lock bar in a direction in which it is engaged with said ratchet wheel; and canceling means pivotally supported by said frame and adapted for canceling the engagement between said ratchet wheel and said lock bar by its pivoting motion, whereby said slip spring and said friction spring prevent the transmission of damaging forces between said lock wheel and said pawl and said receiving member and said lock bar, respectively, when the webbing is forcefully unwound after an emergency vehicular situation, even when said lock wheel and said sensor pawl are still engaged with each other after said emergency situation has ceased.

17. A webbing retractor for a vehicle, which comprises:
(a) a take-up shaft adapted to retain one end of a webbing and biased in a direction in which said webbing is wound up thereon by a biasing means;
(b) lock means having a ratchet wheel rigidly secured to one axial end portion of said take-up shaft so as to rotate together with said take-up shaft, and a lock bar engageable with said ratchet wheel by the action of said second friction member, and activated when an emergency situation of the vehicle occurs so as to lock said take-up shaft from rotating in a direction in which said webbing is unwound;

(c) acceleration detecting means for detecting an emergency situation of the vehicle;

(d) a lock wheel adapted such that, when the vehicle is in a normal state, said lock wheel rotates in unison with the rotation of said take-up shaft, but when an emergency situation of the vehicle occurs, said lock wheel engages with said acceleration detecting means so that the rotation of said lock wheel is delayed with respect to the rotation of said take-up shaft;

(e) engaging means including a pawl activated when the rotation of said lock wheel is delayed, and a receiving member adapted such that, when the vehicle is in a normal state, said receiving member is separated from said pawl, whereas, when said pawl is activated, said receiving member is engaged with said pawl so as to activate said lock means;

(f) first slip means having a first friction member supported by means of a first frictional force within an annular groove formed in said lock wheel around an axis thereof and which is retained at one end portion thereof by said pawl, and disposed between said lock wheel and said pawl to connect them together by means of a predetermined frictional force; and (g) second slip means having a second friction member supported by means of a second frictional force on the outer periphery of said receiving member and adapted to activate said lock means through one end portion thereof, and disposed between said lock means and said receiving member to connect them together by means of a predetermined frictional force, whereby, even when said lock wheel and said acceleration detecting means are still engaged with each other after an emergency situation of the vehicle has ceased, said webbing can be unwound from said take-up shaft without damaging said webbing retractor.

18. A webbing retractor according to claim 17, wherein said second friction member is a friction spring which has a ring-shaped configuration and abuts against said lock bar at one portion thereof so as to move said lock bar in a direction in which it is engaged with said ratchet wheel.

* * * * *